Oct. 8, 1963  R. J. SCOTT  3,106,376
DRAWING BOARD TABLE SUPPORT CLAMP
Filed Sept. 28, 1961

INVENTOR.
ROLAND J. SCOTT.
BY
ATTORNEY.

United States Patent Office

3,106,376
Patented Oct. 8, 1963

3,106,376
DRAWING BOARD TABLE SUPPORT CLAMP
Roland J. Scott, 2918 N. 76th St., Scottsdale, Ariz.
Filed Sept. 28, 1961, Ser. No. 141,372
3 Claims. (Cl. 248—226)

This invention pertains to a support clamp and is particularly directed to a drawing board table support clamp.

One of the objects of this invention is to provide a clamp for supporting a drawing board in conveniently usable position on the edge of a table or other similar supporting structure.

Another object of this invention is to provide a drawing board support clamp of universal construction adapted to readily grip the edge of the top and the apron of a table to securely hold a drawing board in working position.

A further object of this invention is to provide a clamp for engaging the top and the bottom of a table together with a clamp screw adapted to engage the apron of a table to securely lock the clamp device to the table.

Further features and advantages of this invention will appear from a detailed description of the drawings in which.

Figure 1:
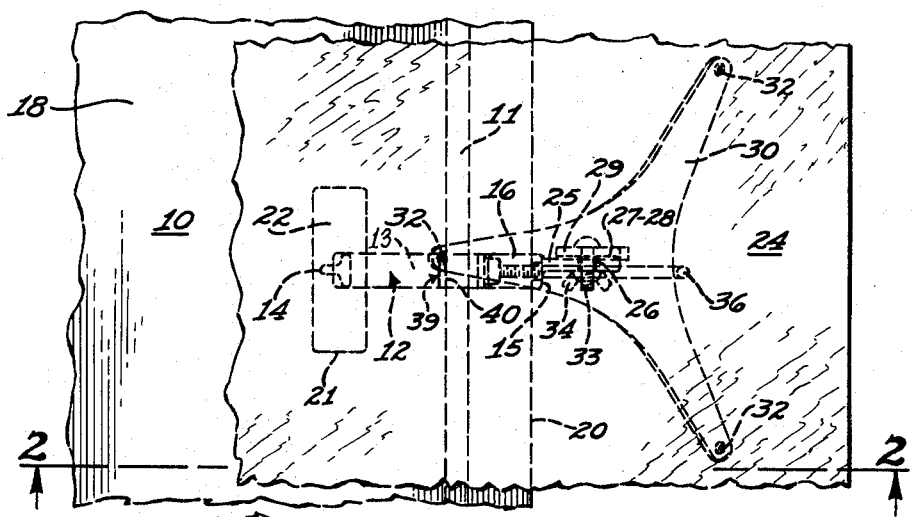
FIG. 1 is a fragmentary plan view of the drawing board table support clamp applied in working position to a table top.

As an example of one embodiment of this invention, there is shown a table having a top 10 and the depending apron 11. The drawing board support clamp comprises the C-shaped member 12 having the bottom 13 and the upstanding rear and front portions 14 and 15, respectively. On the top end of the front portion is formed a turned over inwardly extending portion 16 having a downwardly facing abutment surface 17 which engages the top surface 18 of the top 10 of the table. A vertically disposed inwardly facing abutment surface 19 formed on the front portion of the clamp 12 engages the front edge 20 of the top 10 of the table.

On top of the rear portion 14 is formed a pad 21 having a horizontal upwardly facing abutment surface 22 which is adapted to engage the bottom surface 23 of the top 10 of the table. To adjustably secure the drawing board 24 or other object to the clamp 12 there is formed an integral lug 25 on the upper part of the front portion 15 having a bolt hole 26 and radial serrations 27 extending outwardly therefrom which are engaged by mating serrations 28 formed on the lug 29 of the crow's-foot drawing board support bracket 30 which is fastened to the underside 31 of the drawing board 24 by suitable screws 32. A suitable clamp bolt 33 passes through the lugs 25 and 29 and has a clamping wing nut 34 to lock the drawing board in desired tilted positions.

Clamping pressure to secure the clamp 12 to the table is applied horizontally parallel to the abutment surfaces 17 and 22 and opposed to the abutment surface 19 against the inside surface 35 of the apron 11 of the table at a point below the abutment surfaces 17 and 21. This clamping pressure may be effected by means of a clamp screw 36 having a threaded portion 37 which passes through a clearance hole 38 formed in the front portion 15 of the clamp 12 and having fixed to its outer end the U-shaped member 39 fitting around the apron 11. The U-shaped member 39 has an inner abutment surface 40 adapted to engage the inside surface 35 of the apron 11 when the wing nut 41 carried on the threaded portion 37 of the clamp screw 36 is tightened against the outside face 42 of the front portion 15 to force abutment surface 19 against the front edge 20 of the table top and at the same time forcing abutment 22 against the underside 23 of the top 10 to securely lock the clamp 12 to the table.

Figure 2:
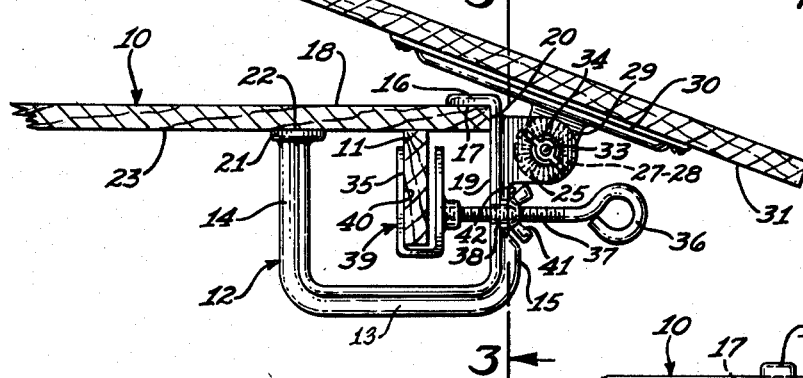
FIG. 2 is a side elevation of the apparatus shown in FIG. 1, shown partly in section on the line 2—2 of FIG. 1.
Figure 3:
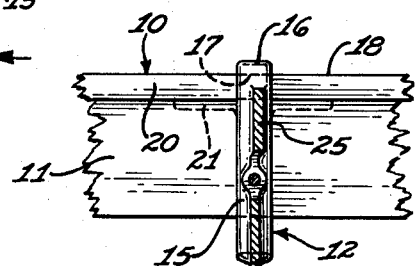
FIG. 3 is a fragmentary section on the line 3—3 of FIG. 2.
Figure 4:
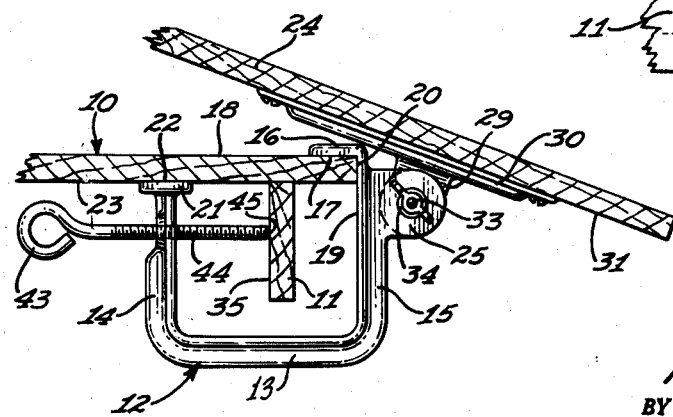
FIG. 4 is a view similar to that of FIG. 2, showing a modification of the clamp screw mechanism.

In FIG. 4 is shown a modification in which a clamp screw 43 is threaded at 44 and has its outer end 45 in abutting contact with the inside surface 35 of the apron 11 so as to secure the clamp 12 to the table as in the case of the showing in FIGS. 1, 2 and 3.

While the apparatus herein disclosed and described constitutes a preferred form of the invention, it is also to be understood that the apparatus is capable of mechanical alteration without departing from the spirit of the invention and that such mechanical arrangement and commerical adaptation as fall within the scope of the appendent claims are intended to be included herein. Having thus fully set forth and described this invention what is claimed and desired to be obtained by United States Letters Patent is:

1. A clamp, adapted to grip and hold an object to a table having a top and an apron depending downwardly from under said top, comprising in combination:
   a. a C-shaped member having a horizontal bottom portion, an upstanding rear portion and an upstanding front portion,
   b. a turned over inwardly extending portion formed on the top of said front portion and having a downwardly facing abutment surface adapted to engage the top surface of the table adjacent an edge of the table top,
   c. a vertically disposed inwardly facing abutment surface formed on the front portion of said clamp adapted to engage the front edge of the table top adjacent said turned over inwardly extending portion of said clamp,
   d. an abutment pad formed on top of said rear portion and having an upwardly facing abutment surface adapted to engage the bottom surface of the table top,
   e. means on the upper part of said front portion for supporting a drawing board and the like on said clamp,
   f. and means on said clamp adapted to engage the inside surface of the table apron with horizontal pressure parallel to and below said abutment surface on said turned over inwardly extending portion and said abutment pad of said clamp and above the lower edge of the table apron in an opposed direction to said vertically disposed inwardly facing abutment surface on said front portion so as to rigidly secure said clamp to the table.

2. A clamp, adapted to grip and hold an object to a table having a top and an apron depending downwardly from under said top, comprising in combination:
   a. a C-shaped member having a horizontal bottom portion, an upstanding rear portion and an upstanding front portion,
   b. a turned over inwardly extending portion formed on the top of said front portion and having a downwardly facing abutment surface adapted to engage the top surface of the table adjacent an edge of the table top,
   c. a vertically disposed inwardly facing abutment surface formed on the front portion of said clamp adapted to engage the front edge of the table top adjacent said turned over inwardly extending portion of said clamp,
d. an abutment pad formed on top of said rear portion and having an upwardly facing abutment surface adapted to engage the bottom surface of the table top,
e. means on the upper part of said front portion for supporting a drawing board and the like on said clamp,
f. means on said clamp adapted to engage the inside surface of the table apron with horizontal pressure parallel to and below said abutment surface on said turned over inwardly extending portion and said abutment pad of said clamp and above the lower edge of the table apron in an opposed direction to said vertically disposed inwardly facing abutment surface on said front portion so as to rigidly secure said clamp to the table,
g. said last mentioned means on said clamp comprising a horizontally disposed clamp screw having a threaded portion passing through a clearance hole formed in the front portion of said clamp,
h. a U-shaped member fixed to the outer end of said clamp screw adapted to fit around the table apron and having,
i. an inner abutment surface adapted to engage the inside surface of the table apron,
j. and a wing nut on said threaded portion of said clamp screw adapted to be tightened against the outside face of said front portion of said clamp.

3. A clamp, adapted to grip and hold an object to a table having a top and an apron depending downwardly from under said top, comprising in combination:
a. a C-shaped member having a horizontal bottom portion, an upstanding rear portion and an upstanding front portion,
b. a turned over inwardly extending portion formed on the top of said front portion and having a downwardly facing abutment surface adapted to engage the top surface of the table adjacent an edge of the table top,
c. a vertically disposed inwardly facing abutment surface formed on the front portion of said clamp adapted to engage the front edge of the table top adjacent said turned over inwardly extending portion of said clamp,
d. an abutment pad formed on top of said rear portion and having an upwardly facing abutment surface adapted to engage the bottom surface of the table top,
e. means on the upper part of said front portion for supporting a drawing board and the like on said clamp,
f. means on said clamp adapted to engage the inside surface of the table apron with horizontal pressure parallel to and below said abutment surface on said turned over inwardly extending portion and said abutment pad of said clamp and above the lower edge of the table apron in an opposed direction to said vertically disposed inwardly facing abutment surface on said front portion so as to rigidly secure said clamp to the table,
g. said last mentioned means including a clamp screw having a threaded portion carried in a mating horizontal threaded bore in said rear portion of said clamp adapted to engage the inside surface of the table apron above the lower edge thereof.

References Cited in the file of this patent

UNITED STATES PATENTS

| | | |
|---|---|---|
| 201,863 | Burnett | Apr. 2, 1878 |
| 2,148,307 | Scott | Feb. 21, 1939 |